(12) United States Patent
Yamashita et al.

(10) Patent No.: US 11,358,446 B2
(45) Date of Patent: Jun. 14, 2022

(54) SLIDE DOOR STRUCTURE

(71) Applicant: YAZAKI CORPORATION, Tokyo (JP)

(72) Inventors: Hiroshi Yamashita, Makinohara (JP); Shinji Kato, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 246 days.

(21) Appl. No.: 16/865,794

(22) Filed: May 4, 2020

(65) Prior Publication Data

US 2020/0384835 A1    Dec. 10, 2020

(30) Foreign Application Priority Data

Jun. 6, 2019   (JP) .............................. JP2019-106306

(51) Int. Cl.
*B60R 16/027* (2006.01)
*B60J 5/06* (2006.01)
*H02G 11/00* (2006.01)
*B60R 16/02* (2006.01)

(52) U.S. Cl.
CPC ............. *B60J 5/06* (2013.01); *B60R 16/0207* (2013.01); *H02G 11/00* (2013.01)

(58) Field of Classification Search
CPC .. B60R 16/0207; B60R 16/0215; H02G 11/00
USPC .......................................................... 296/155
See application file for complete search history.

(56) References Cited

U.S. PATENT DOCUMENTS

| 2007/0084619 A1 | 4/2007 | Kisu et al. |
| 2016/0229360 A1 | 8/2016 | Iimuro |

FOREIGN PATENT DOCUMENTS

| JP | 2010-17025 A | 1/2010 |
| JP | 2013-162716 A | 8/2013 |
| JP | 2015-67153 A | 4/2015 |

*Primary Examiner* — Dennis H Pedder
(74) *Attorney, Agent, or Firm* — Sughrue Mion, PLLC

(57) ABSTRACT

A slide door structure includes: a slide door provided to be movable with respect to a vehicle body; and a wire harness routed between the vehicle body and the slide door by allowing an electric wire bundle to pass through a bendable exterior member. The wire harness is connected to the slide door by door-side fixture including an outer member attached to the slide door and an inner member provided on the wire harness and supported by the outer member so as to be rotatable about an axis in an upper-lower direction as a center. In the door-side fixture, the inner member is supported by the outer member so as to be slidable in a direction perpendicular to the axis.

4 Claims, 9 Drawing Sheets

SLIDE DOOR STRUCTURE

CROSS REFERENCE TO RELATED APPLICATIONS

This application is based on and claims priority from Japanese patent application No. 2019-106306 filed on Jun. 6, 2019, the entire contents of which are incorporated herein by reference.

BACKGROUND OF THE INVENTION

1. Technical Field

The present invention relates to a slide door structure including a slide door movably provided between a closed position and an opened position with respect to a vehicle body, and a wire harness routed between the vehicle body and the slide door.

2. Background Art

A wire harnesses routed in a vehicle may be routed between a vehicle body and a slide door that is slidable with respect to the vehicle body at an entrance opening of the vehicle body (for example, see Patent Literatures JP-A-2010-017025 and JP-A-2013-162716). In this wire harness, end portions of a bendable exterior member through which an electric wire bundle passes are rotatably supported by the vehicle body and the door via attachment portions.

SUMMARY

In a slide door structure including the above wire harness, when the slide door is opened and closed, vicinity of the end portion of the exterior member supported on a door side may be largely bent to protrude toward the vehicle body, and may come into contact with a scuff plate and the like of the vehicle body. In a case of contact, abnormal noise may be generated due to contact between the exterior member and the scuff plate, and damage may occur in the exterior member or the scuff plate.

The present invention has been made in view of the above-described circumstances, and an object thereof is to provide a slide door structure capable of preventing abnormal noise and damage when a slide door moves.

In order to achieve the above object, a slide door structure according to the present invention is characterized by the following (1) to (5).

(1) A slide door structure includes:
a slide door provided so as to be movable with respect to a vehicle body; and
a wire harness routed between the vehicle body and the slide door by allowing an electric wire bundle to pass through a bendable exterior member.
The wire harness is connected to the slide door by a fixture including an outer member attached to the slide door and an inner member provided on the wire harness and supported by the outer member so as to be rotatable about an axis in an upper-lower direction as a center.
In the fixture, the inner member is supported by the outer member so as to be slidable in a direction perpendicular to the axis.

(2) In the slide door structure according to (1).
a guide groove along a sliding direction of the inner member is formed in the outer member, and
a guide rib that engages with the guide groove is formed in the inner member.

(3) In the slide door structure according to (1),
a shaft portion is formed in the inner member,
a support hole formed of a long hole is formed in the outer member, and
the shaft portion is inserted into the support hole and the inner member is rotatably and slidably supported by the outer member.

(4) In the slide door structure according to (1),
the inner member is supported by the outer member so as to be slidable along a front-rear direction of the vehicle body.

(5) hi the slide door structure according to (1),
the inner member is supported by the outer member so as to be slidable along a width direction of the vehicle body.

According to the slide door structure configured as in (1), in the fixture that supports the wire harness on the slide door, when the slide door moves, the inner member to which the wire harness is connected rotates with respect to the outer member on a slide door side, and slides in a direction perpendicular to a center axis of the rotation. Therefore, when the slide door moves, the wire harness can be moved along a movement trajectory that is gentler than a movement trajectory of the slide door. Thereby, a radius of curvature of a bent portion of the wire harness that is bent with the movement of the slide door can lie increased. Therefore, abnormal noise and damage to the wire harness and a scuff plate due to the wire harness protruding largely to come into contact with the scuff plate or the like of the vehicle body can be prevented. Since the bending radius of the wire harness is increased, bending durability performance can be improved.

According to the slide door structure configured as in (2), since the guide rib of the inner member is engaged with the guide groove of the outer member, the inner member can slide stably with respect to the outer member without rattling.

According to the slide door structure configured as in (3), the shaft portion of the inner member can smoothly slide with respect to the support hole formed of the long hole of five outer member in a range of the support hole.

According to the slide door structure configured as in (4), when the slide door moves in the front-rear direction with respect to the vehicle body, the inner member can slide along the front-rear direction of the vehicle body with respect to the outer member attached to the slide door, and the wire harness can be prevented from protruding.

According to the slide door structure configured as in (5), for example, when the slide door moves in the width direction of the vehicle body with respect to the vehicle body at a start of opening operation or an end of closing operation, the inner member can slide along the width direction of the vehicle body with respect to the outer member, and the wire harness can be prevented from protruding.

According to the present invention, the slide door structure capable of preventing abnormal noise and damage when the slide door moves can be provided.

The present invention has been briefly described as above. Further, details of the present invention will be clarified by reading throughout a mode (hereinafter, referred to as "embodiment") for carrying out the present invention described below with reference to the accompanying drawings.

BRIEF DESCRIPTION OF THE DRAWINGS

FIG. 4A is a side view, and FIG. 4B is a cross-sectional view taken along line A-A in FIG. 4A.

FIG. 5A is a side view, and FIG. 5B is a cross-sectional view taken along line B-B in FIG. 5A.

FIG. 6A is a schematic view of the wire harness in a fully closed state, and FIG. 6B is a schematic view of the wire harness in an initially opened state.

FIG. 7A is a schematic view of the wire harness in the fully closed state, and FIG. 7B is a schematic view of the wire harness in the initially opened state.

FIG. 9A is a side view, and FIG. 9B is a cross-sectional view taken long line C-C in FIG. 9A.

DETAILED DESCRIPTION OF EMBODIMENTS

A specific embodiment of the present invention will be described below with reference to the drawings.

Figure 1:
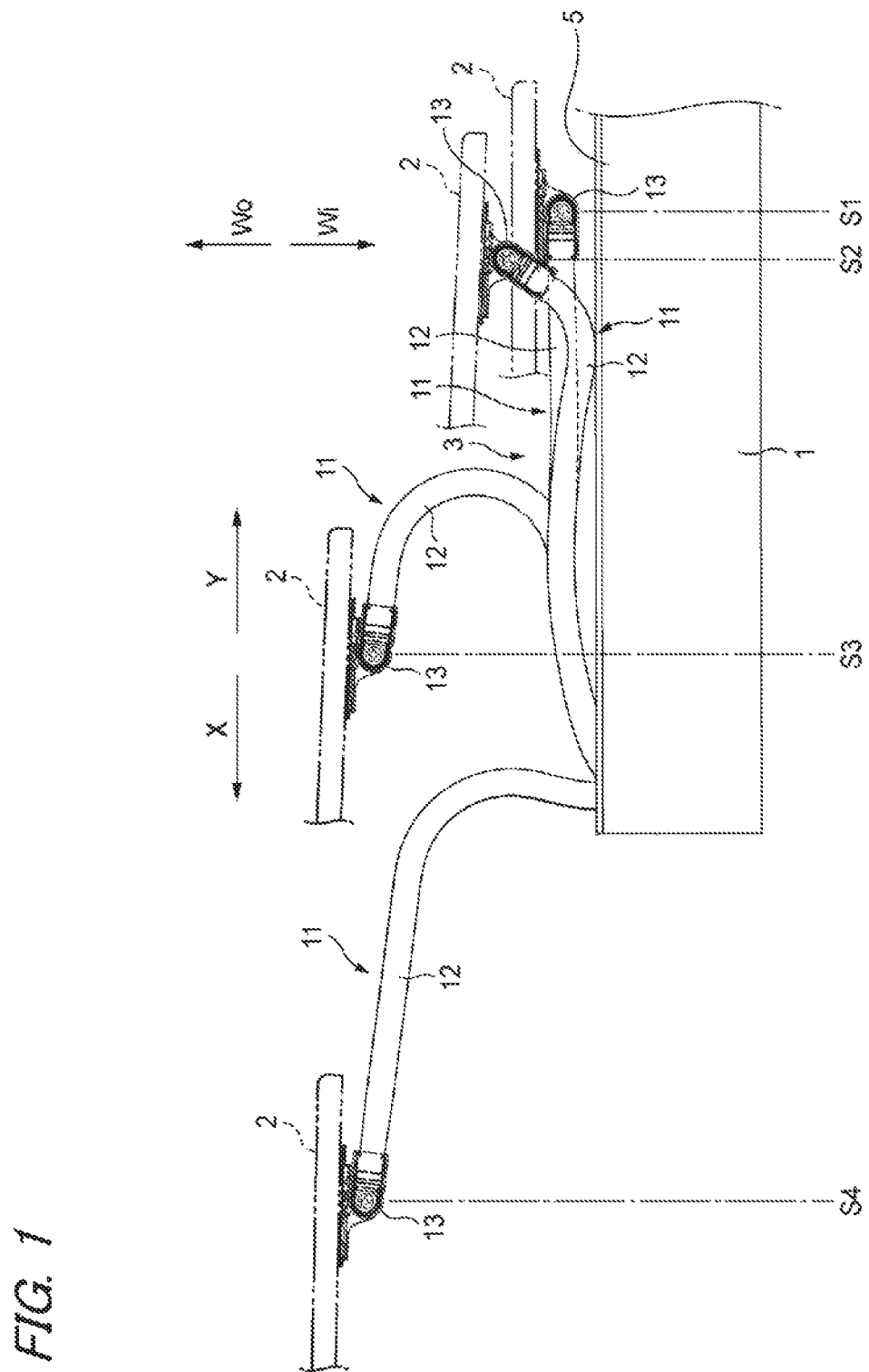
FIG. 1 is a schematic view showing movement of a wire harness with movement of a slide door.

FIG. 1 is a schematic view showing movement of a wire harness with movement of a slide door. As shown in FIG. 1, a slide door structure according to the present embodiment includes a slide door 2 slidable between a closed position and an opened position with respect to a vehicle hotly 1 of a vehicle such as an automobile, and a wire harness 11 routed between the vehicle body 1 and the slide door 2. The slide door 2 slides in a front-rear direction with respect to the vehicle body 1 so as to open and close an entrance opening 3 having a scuff plate 5 provided on a side portion of the vehicle body 1.

The wire harness 11 is provided for supplying electric power to various electric components and auxiliary machines provided on the slide door 2 and for transmitting and receiving various signals between the vehicle body 1 and the slide door 2. The wire harness 11 includes a plurality of electric wire bundles (not shown), and the electric wire bundles pass through a bendable exterior member 12. The exterior member 12 may be, for example, a corrugated tube formed of a flexible resin material or a cableveyor (registered trademark) in which a plurality of link members are rotatably connected.

One end of the exterior member 12 of the wire harness 11 is connected to the slide door 2 by a door-side fixture 13. The other end of the exterior member 12 of the wire harness 11 is connected to the vehicle body 1 by a vehicle body-side fixture (not shown).

In the vehicle including the slide door 2, when opening operation of the door is started from a folly closed state in which the entrance opening 3 is closed by the slide door 2 (an S1 state in FIG. 1), the slide door 2 moves in an opening direction (an X direction) while moving outward in a width direction of the vehicle body 1 (a Wo direction) to be in an initially opened state (an S2 state in FIG. 1). Further, the slide door 2 moves largely in the opening direction (the X direction) while moving outward in the width direction of the vehicle body 1 (the Wo direction) to be in a half-opened state (an S3 state in FIG. 1). Thereafter, the slide door 2 moves in the opening direction (the X direction) to be in a fully opened state (an S4 state in FIG. 1). Thereby, the entire entrance opening 3 is opened.

Contrary to the opening operation, when closing operation of the door is started from the fully opened state in which the entire entrance opening 3 is opened (the S4 state in FIG. 1), the slide door 2 moves in a closing direction (a Y direction) to be in the half-opened state (the S3 state in FIG. 1). Thereafter, the slide door 2 moves inward in the width direction of the vehicle body 1 (a Wi direction) while moving in the closing direction (the Y direction) to be in the initially opened state (the S2 state in FIG. 1). Further, the slide door 2 moves inward in the width direction of the vehicle body 1 (the Wi direction) while moving in the closing direction (the Y direction) to be in the fully closed state (the S1 state in FIG. 1). Thereby, the enhance opening 3 is closed.

Figure 2:
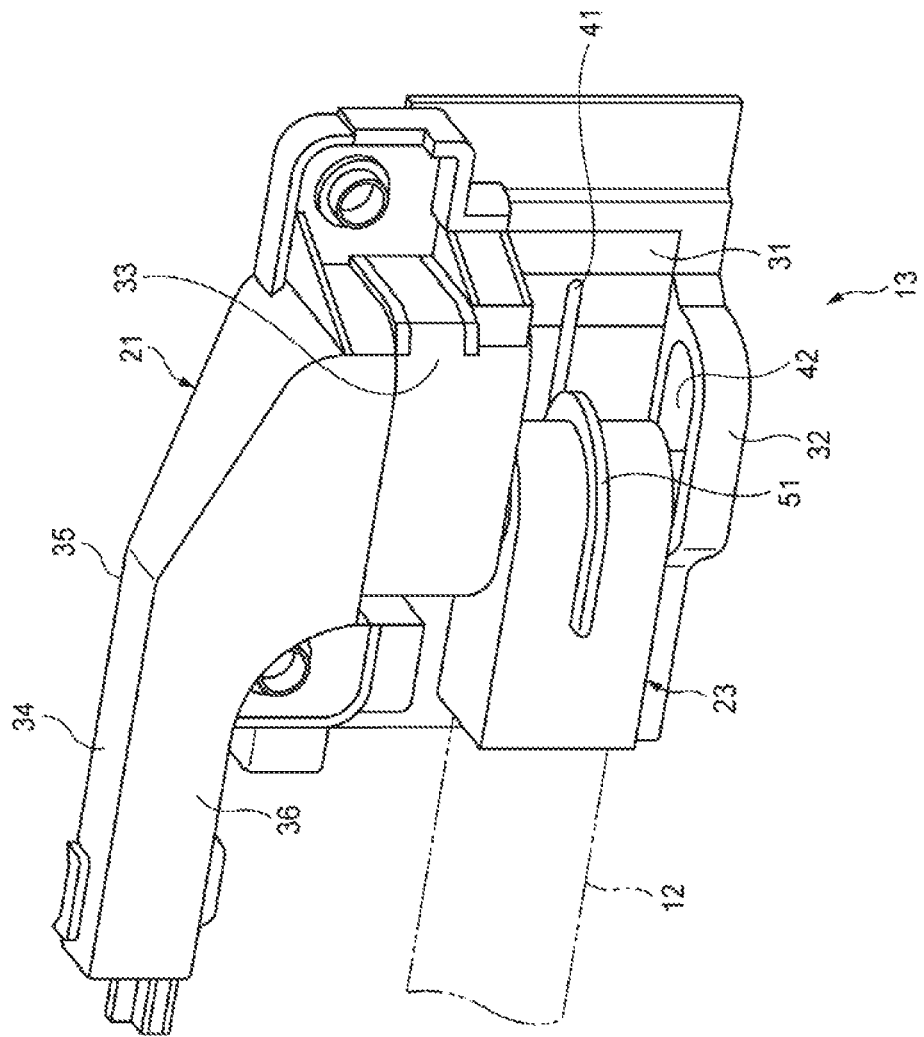
FIG. 2 is a perspective view of a door-side fixture.
Figure 3:
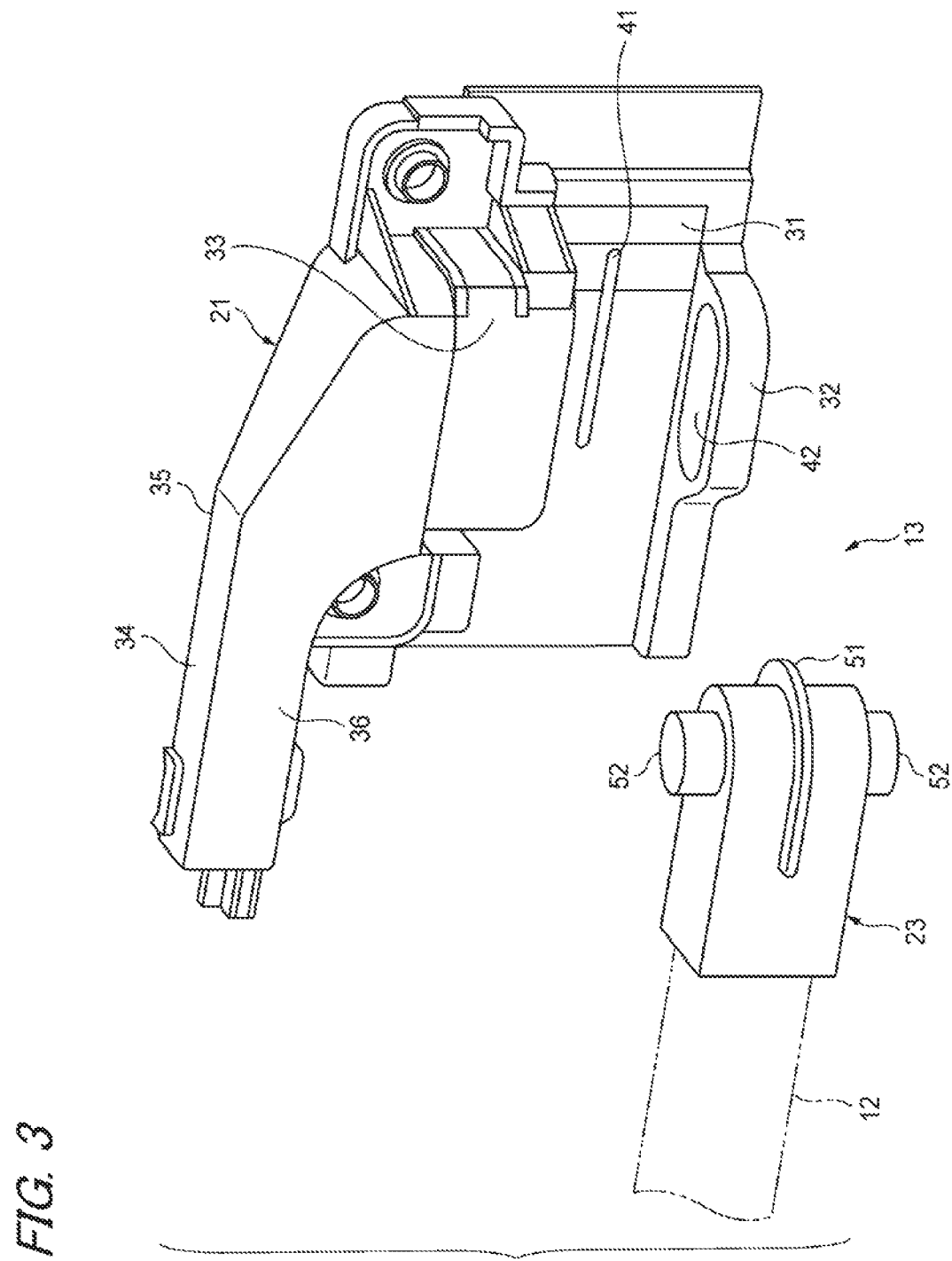
FIG. 3 is a perspective view of an outer member and an inner member of the door-side fixture.
Figure 4A:
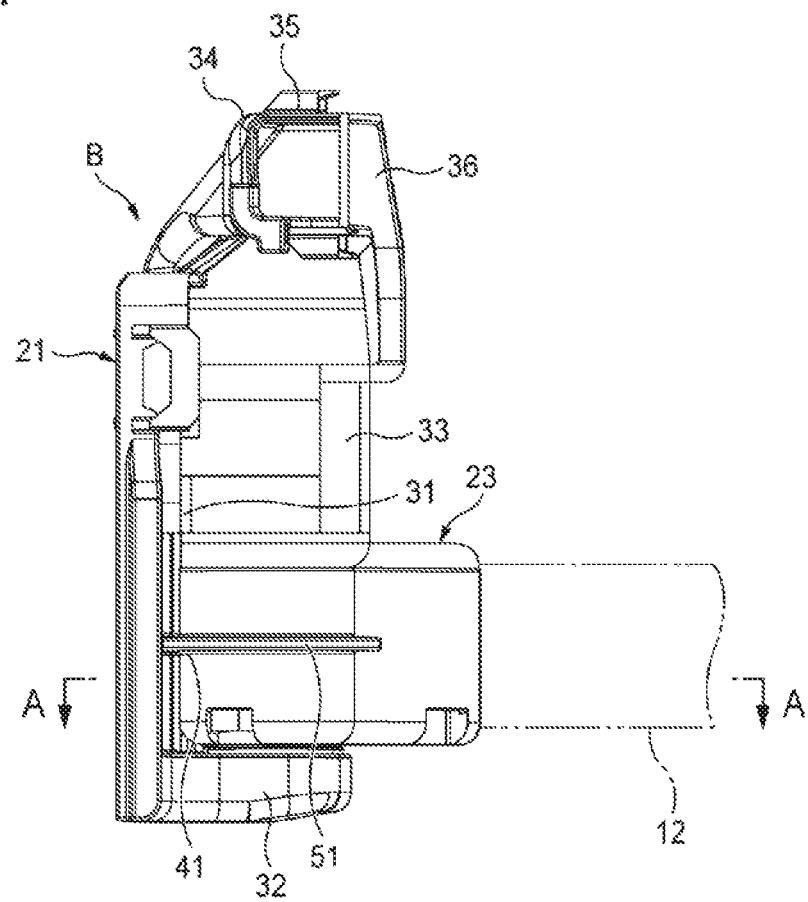
FIGS. 4A and 4B are views showing the door-side fixture.
Figure 4B:
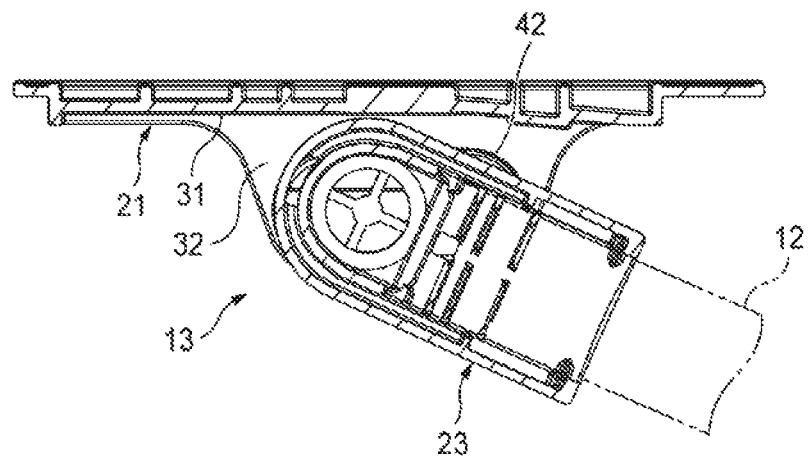
Figure 5A:
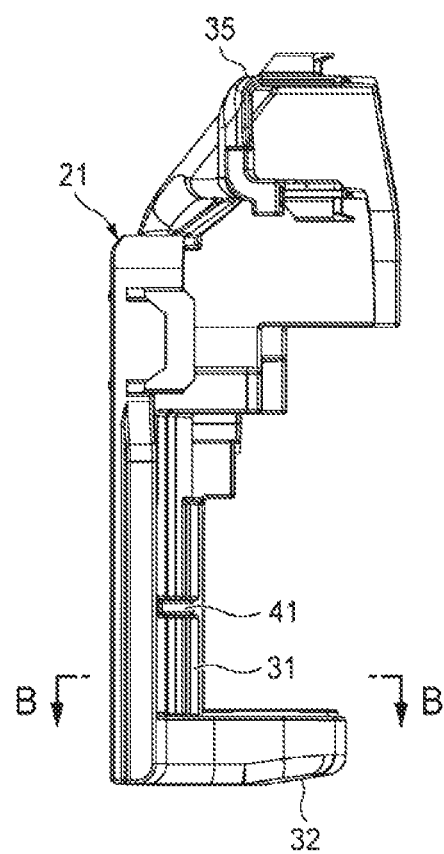
FIGS. 5A and 5B are views showing the outer member.
Figure 5B:
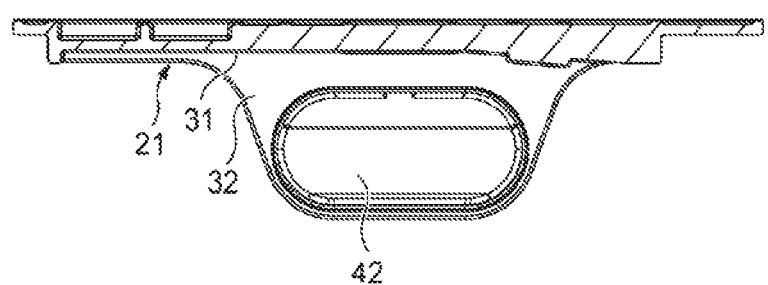

FIG. 2 is a perspective view of a door-side fixture. FIG. 3 is a perspective view of an outer member and an inner member of the door-side fixture. FIGS. 4A and 4B are views showing the door-side fixture. FIG. 4A is a side view, and FIG. 4B is a cross-sectional view taken along line A-A in FIG. 4A. FIGS. 5A and 5B are views showing the outer member. FIG. 5A is a side view, and FIG. 5B is a cross-sectional view taken along line B-B in FIG. 5A.

As shown in FIGS. 2, 3, 4A and 4B, the door-side fixture 13 includes an outer member 21 fixed to an inner panel of the slide door 2 and an inner member 23 supported by the outer member 21 so as to be rotatable in a horizontal direction. The end portion of the exterior member 12 through which the electric wire bundles pass is connected to the inner member 23. Each of the outer member 21 and the inner member 23 is formed of a synthetic resin.

The outer member 21 includes a side wall portion 31, a lower support portion 32 and an upper support portion 33. The lower support portion 32 and the upper support portion 33 are provided on the side wall portion 31, and respectively protrude laterally from the side wall portion 31. The lower support portion 32 is provided on a lower end side of the side wall portion 31, and the upper support portion 33 is provided on an upper end side of the side wall portion 31. The lower support portion 32 and the upper support portion 33 are arranged to be spaced apart from each other. The upper support portion 33 is provided with a protector portion 34 through winch the electric wire bundles constituting the wire harness 11 pass. The protector portion 34 of the upper support portion 33 includes a case portion 35 formed on the side wall portion 31 side and a cover portion 36 assembled to the case portion 35.

As shown in FIGS. 5A and 5B, in the outer member 21, a guide groove 41 extending in the horizontal direction is formed between the lower support portion 32 and the upper support portion 33 in the side wall portion 31. In the lower support portion 32 and the upper support portion 33, support holes 42 each formed of a long hole long in the front-rear direction of the vehicle body 1 (the support hole 42 of the upper support portion 33 is not shown) is formed. The support hole 42 of the upper support portion 33 is formed by assembling the cover portion 36 to the case portion 35.

As shown in FIG. 3, an end portion of the inner member 23 on a side opposite to a side connected with the exterior member 12 is formed in an arc shape in a plan view, and a guide rib 51 protruding radially outward is formed along a circumferential direction at the end portion having the arc shape in the plan view. The inner member 23 includes a shaft portion 52 protruding upward and downward.

In the inner member 23, the shaft portion 52 on a lower side is inserted into and supported by the support hole 42 formed in the lower support portion 32 of the outer member 21, and the shaft portion 52 on an upper side is inserted into and supported by the support hole 42 formed in the upper support portion 33 of the outer member 21. Thereby, the inner member 23 is supported by the outer member 21 so as to be rotatable about a center of the shaft portion 52 as an axis, and is slidable along the side wall portion 31 in a range of the support hole 42 formed of the long hole. When the inner member 23 is supported by the outer member 21, the guide rib 51 of the inner member 23 is engaged with the guide groove 41 formed in the side wall portion 31 of the outer member 21.

Next, the movement in the slide door structure described above when shifting from (lie closed state to the initially opened state will be described.

Figure 6A:
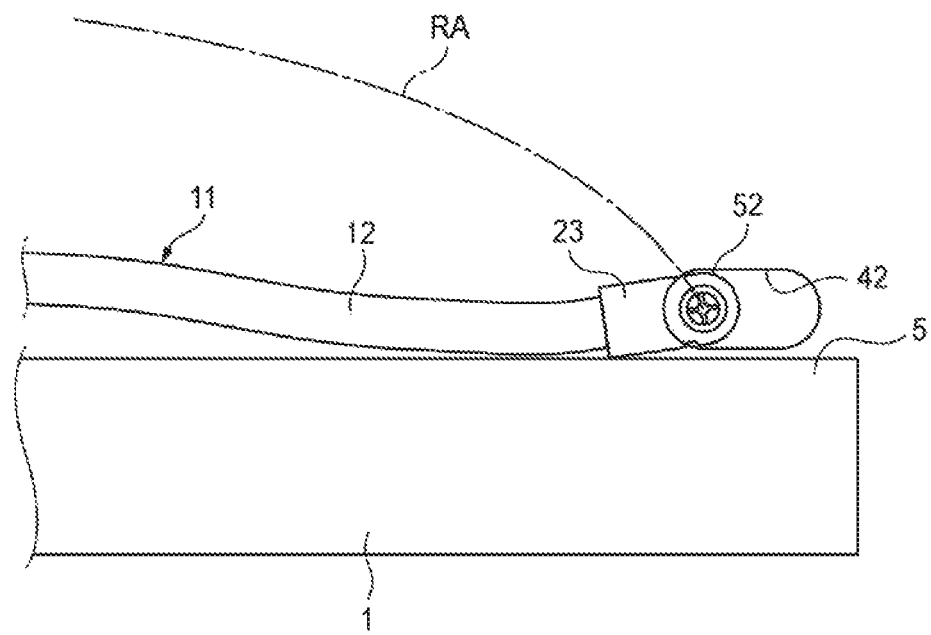
FIGS. 6A and 6B are views showing a state of the wire harness with the movement of the slide door.
Figure 6B:
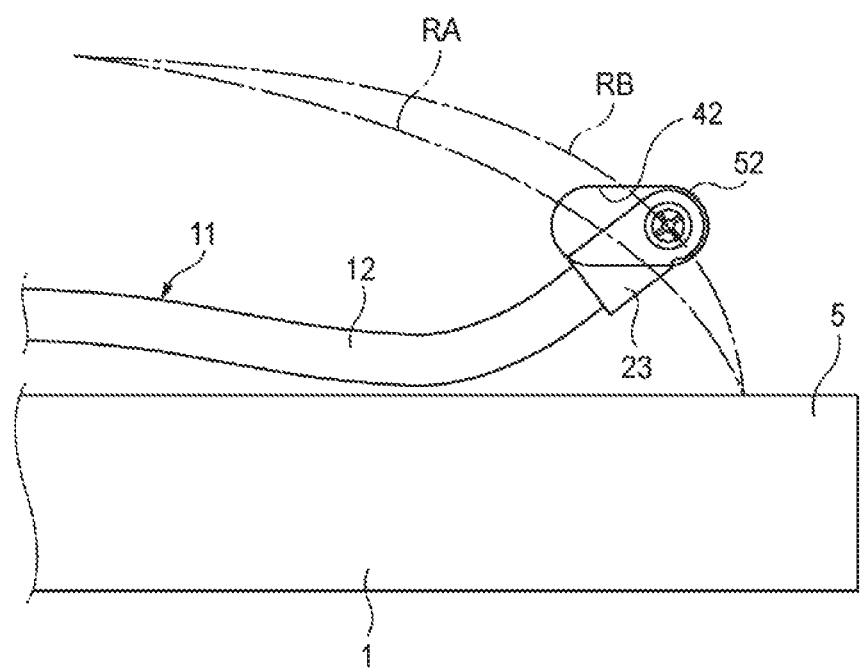

FIGS. 6A and 6B are views showing a state of the wire harness with the movement of the slide door. FIG. 6A is a schematic view of the wire harness in the fully closed state, and FIG. 6B is a schematic view of the wire harness in the initially opened state.

As shown in FIG. 6A, in the fully closed state in which the entrance opening 3 is closed by the slide door 2, in the door-side fixture 13, the shaft portion 52 of the inner member 23 is arranged on a rear side of the vehicle body 1, which is one end side of the support hole 42 of the outer member 21. That is, in the fully closed state, the inner member 23 is disposed in the outer member 21 near the rear side of the vehicle body 1.

When the opening operation of the door is started from the fully closed state and the slide door 2 moves to be in the initially opened state, in the door-side fixture 13, the inner member 23 is pressed toward a front side of the vehicle body 1 relative to the outer member 21 due to rigidity of the exterior member 12 of the wire harness 11 as shown in FIG. 6B. Thereby, the shaft portion 52 of the inner member 23 moves toward the from side of the vehicle body 1, which is the other end side of the support hole 42 of the outer member 21. Then, the inner member 23 is arranged m the outer member 21 near the front side of the vehicle body 1 by being in the initially opened state.

Thereby, with respect to a movement trajectory RA of the support hole 42 on the rear side of the vehicle body 1 with the movement of the slide door 2, the shaft portion 52 of the inner member 23 bulges outward from the movement trajectory RA moves along a movement trajectory RB away from the vehicle body 1.

Here, a reference example will be described.

Figure 7A:
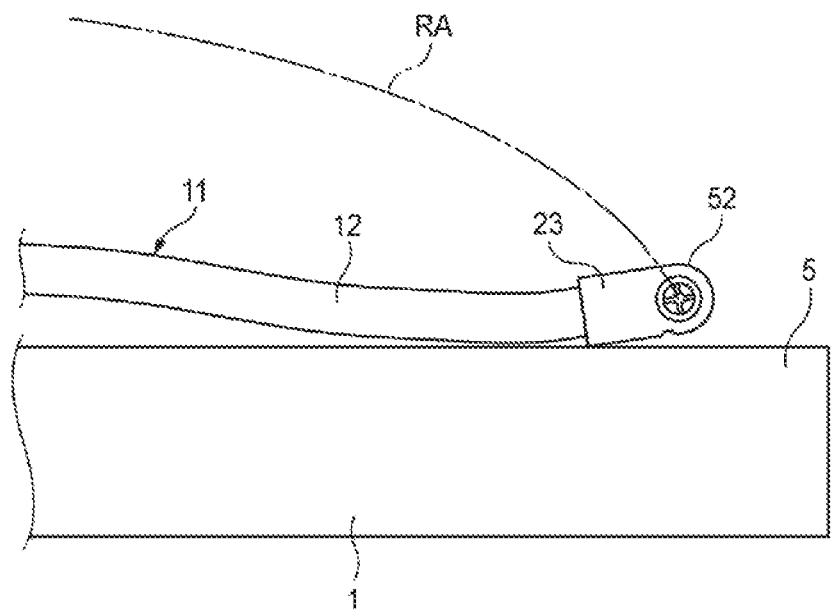
FIGS. 7A and 7B are views showing a reference example.
Figure 7B:
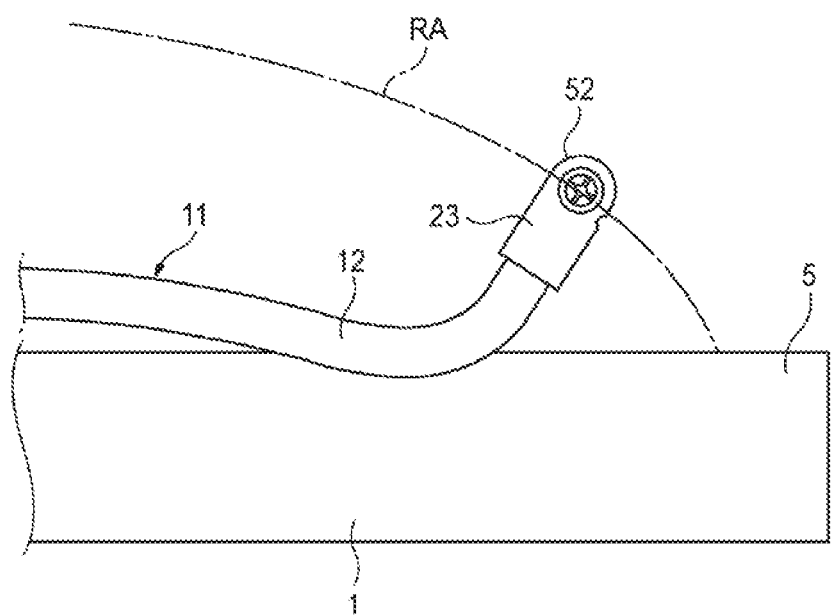

FIGS. 7A and 7B are views showing the reference example. FIG. 7A is a schematic view of the wire harness in the fully closed state, and FIG. 7B is a schematic view of the wire harness in the initially opened state.

In the reference example, the shah portion 52 of the inner member 23 is rotatably supported by a support hole formed of a round hole. Therefore, in the reference example, the inner member 23 does not slide with respect to the outer member 21. In a case of a structure according to the reference example, when shifting from the fully closed state (the state in FIG. 7A) to the initially opened slate (the state in FIG. 7B), the shaft portion 52 moves along the movement trajectory RA of the support hole formed of the round hole. That is, the shaft portion 52 moves along the movement trajectory RA close to the vehicle body 1. Then, in the wire harness 11 to which the inner member 23 is connected, vicinity of the inner member 23 is largely bent and protrudes toward the vehicle body 1. In this case, a bent portion of the exterior member 12 of the wire harness 11 comes into contact with the scuff plate 5 provided in the entrance opening 3, which may result in abnormal noise and damage to the exterior member 12 and the scuff plate 5. In addition, since the wire harness 11 protrudes toward the vehicle body 1, an appearance is deteriorated, and moreover, a radius of curvature of the wire harness 11 at the bent portion is reduced, and bending durability performance is decreased.

In contrast, according to the slide door structure according to the present embodiment, in the door-side fixture 13 that supports the wire harness 11 on the slide door 2, when the slide door 2 moves, the inner member 23 to which the wire harness 11 is connected rotates with respect to the outer member 21 on a slide door 2 side, and slides in a direction perpendicular to a center axis of the rotation. Therefore, when the slide door 2 moves, the wire harness 11 can be moved along the movement trajectory RB that is gentler than the movement trajectory RA of the slide door 2. Thereby, a radius of curvature of a bent portion of the wire harness 11 that is bent with the movement of the slide door 2 can be increased. Therefore, abnormal noise and damage to the wire harness 11 and the scuff plate 5 due to the wire harness 11 protruding largely to come into contact with the scuff plate 5 or the like of the vehicle body 1 can be prevented. Since the bending radius of the wire harness 11 is increased, bending durability performance can be improved.

Since the guide rib 51 of the inner member 23 is engaged with the guide groove 41 of the outer member 21, the inner member 23 can slide stably with respect to the outer member 21 without rattling.

In addition, since the structure is provided in winch the shaft portion 52 is inserted into the support hole 42 formed of the long hole and the tuner member 23 is rotatably and slidably supported by the outer member 21, the shaft portion 52 of the inner member 23 can smoothly slide with respect to the support hole 42 formed of the long hole of the outer member 21 in the range of the support hole 42.

In particular, the inner member 23 is supported by the outer member 21 so as to be slidable along the front-rear direction of the vehicle body 1. Therefore, when the slide door 2 moves in the front-rear direction with respect to the vehicle body 1, the inner member 23 can slide along the front-rear direction of the vehicle body 1 with respect to the outer member 21 attached to the slide door 2, and the wire harness 11 can be prevented from protruding.

Next, a modification will be described.

Figure 8:
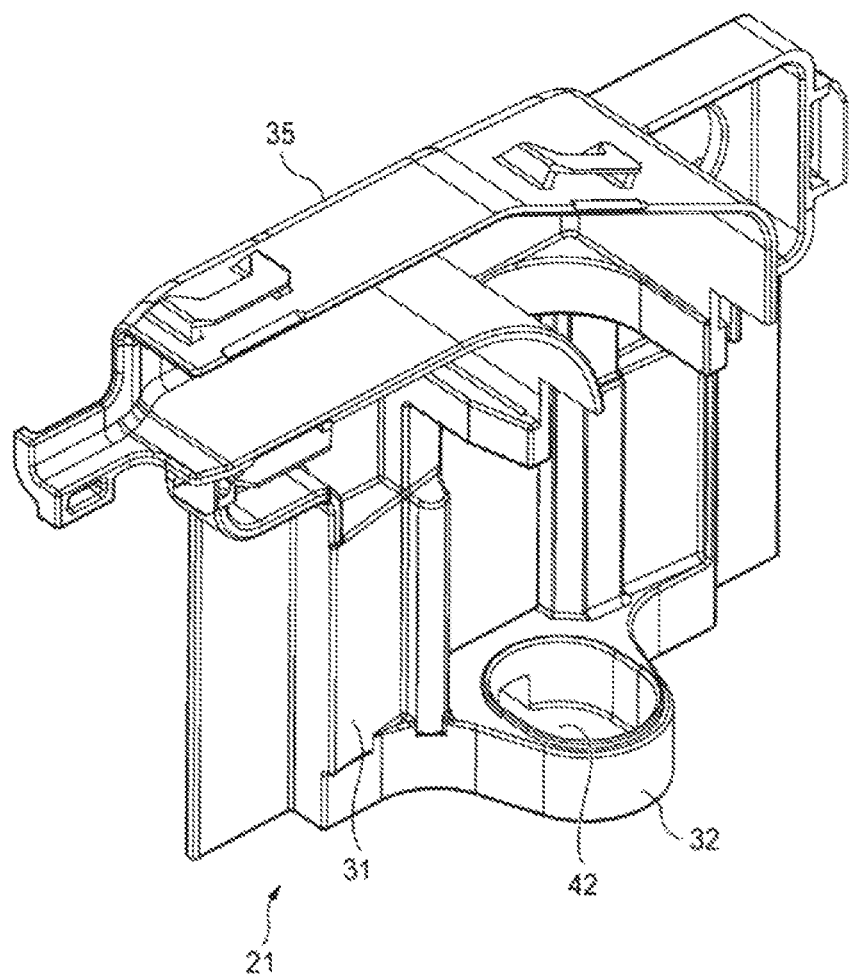
FIG. 8 is a perspective view of an outer member according to a modification.
Figure 9A:
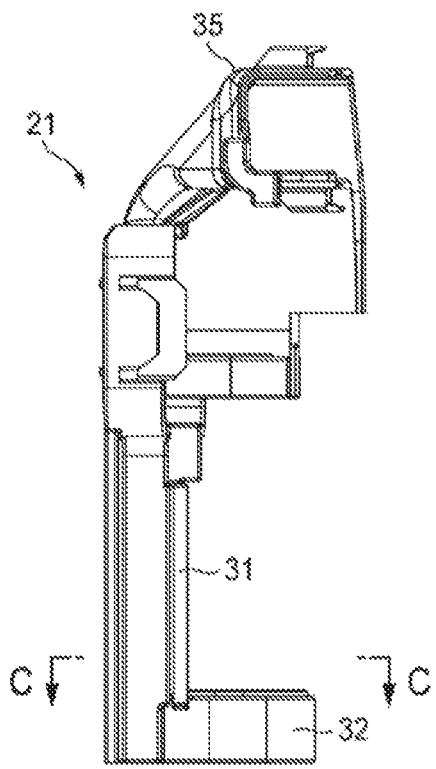
FIGS. 9A and 9B are views showing the outer member according to the modification.
Figure 9B:
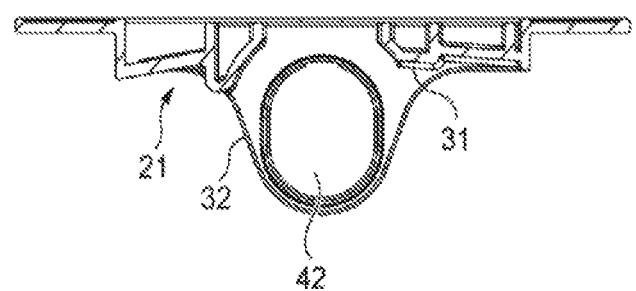

FIG. 8 is a perspective view of an outer member according to the modification. FIGS. 9A and 9B are views showing the outer member according to the modification. FIG. 9A is a side view, and FIG. 9B is a cross-sectional view taken long line C-C in FIG. 9A.

In the modification as shown in FIGS. 8, 9A and 9B, the support hole 42 formed of a long hole long in a width direction of the vehicle body 1 is formed in the outer member 21. Thereby, in the door-side fixture 13 including the outer member 21, the inner member 23 is slidable in the width direction of the vehicle body 1.

In a case of a slide door structure including the door-side fixture 13, the inner member 23 is supported by the outer member 21 so as to be slidable along the width direction of the vehicle body 1. Therefore, when the slide door 2 moves in the width direction of the vehicle body 1 with respect to the vehicle body 1 at a start of opening operation or an end of closing operation, the inner member 23 can slide along the width direction of the vehicle body 1 with respect to the outer member 21, and the wire harness 11 can be prevented from protruding.

The present invention is not limited to the embodiment described above and may be appropriately modified, improved, or the like. In addition, the material, shape, size, member, arrangement location and the like of each component in the embodiment described above are arbitrary and are not limited as long as the present invention can be achieved.

For example, a direction of a long axis of the support hole 42 of the outer member 21 is not limited to the front-rear direction of the vehicle body 1 and the width direction of the vehicle body 1, but may be oblique to the vehicle body 1.

Here, features of the slide door structure according to the embodiment of the present invention described above will be briefly summarized and listed in the following [1] to [5].

[1] A slide door structure includes:
a slide door (2) provided to be movable with respect to a vehicle body (1); and
a wire harness (11) routed between the vehicle body (1) and the slide door (2) by allowing an electric wire bundle to pass through a bendable exterior member (12).
The wire harness (11) is connected to the slide door (2) by a fixture (door-side fixture 13) including an outer member (21) attached to the slide door (2) and an inner member (23) provided on the wire harness (11) and supported by the outer member (21) so as to be rotatable about an axis in an upper-lower direction as a center.
In the fixture (door-side fixture 13), the inner member (23) is supported by the outer member (21) so as to be slidable in a direction perpendicular to the axis.

[2] In the slide door structure according to [1],
a guide groove (41) along a sliding direction of the inner member (23) is formed in the outer member (21), and
a guide rib (51) that engages with the guide groove (41) is formed in the inner member (23).

[3] In the slide door structure according to [1],
a shaft portion (52) is formed in the inner member (23),
a support hole (42) formed of a long hole is formed in the outer member (21), and
the shaft portion (52) is inserted into the support hole (42) and the inner member (23) is rotatably and slidably supported by the outer member (21).

[4] In the slide door structure according to [1],
the inner member (23) is supported by the outer member (21) so as to be slidable along a front-rear direction of the vehicle body (1).

[5] In the slide door structure according to [1],
the inner member (23) is supported by the outer member (21) so as to be slidable along a width direction of the vehicle body (1).

What is claimed is:

1. A slide door structure comprising:
a slide door provided so as to be movable with respect to a vehicle body; and
a wire harness routed between the vehicle body and the slide door by allowing an electric wire bundle to pass through a bendable exterior member,
wherein the wire harness is connected to the slide door by a fixture including an outer member attached to the slide door and an inner member provided on the wire harness and supported by the outer member so as to be rotatable about an axis in an upper-lower direction as a center,
wherein in the fixture, the inner member is supported by the outer member so as to be slidable in a direction perpendicular to the axis,
wherein a shaft portion is formed in the inner member,
wherein a support hole formed of a long hole is formed in the outer member, and
wherein the shaft portion is inserted into the support hole and the inner member is rotatably and slidably supported by the outer member.

2. The slide door structure according to claim 1,
wherein a guide groove along a sliding direction of the inner member is formed in the outer member, and
wherein a guide rib that engages with the guide groove is formed in the inner member.

3. The slide door structure according to claim 1,
wherein the inner member is supported by the outer member so as to be slidable along a front-rear direction of the vehicle body.

4. A slide door structure comprising:
a slide door provided so as to be movable with respect to a vehicle body; and
a wire harness routed between the vehicle body and the slide door by allowing an electric wire bundle to pass through a bendable exterior member,
wherein the wire harness is connected to the slide door by a fixture including an outer member attached to the slide door and an inner member provided on the wire harness and supported by the outer member so as to be rotatable about an axis in an upper-lower direction as a center,
wherein in the fixture, the inner member is supported by the outer member so as to be slidable in a direction perpendicular to the axis, and
wherein the inner member is supported by the outer member so as to be slidable along a width direction of the vehicle body.

\* \* \* \* \*